US010410227B2

(12) United States Patent
Strauss et al.

(10) Patent No.: US 10,410,227 B2
(45) Date of Patent: Sep. 10, 2019

(54) SYSTEM, METHOD, AND COMPUTER PROGRAM FOR FORECASTING RESIDUAL VALUES OF A DURABLE GOOD OVER TIME

(71) Applicant: ALG, Inc., Santa Monica, CA (US)

(72) Inventors: Oliver Thomas Strauss, Santa Barbara, CA (US); Morgan Scott Hansen, Santa Monica, CA (US)

(73) Assignee: ALG, Inc., Santa Monica, CA (US)

( * ) Notice: Subject to any disclaimer, the term of this patent is extended or adjusted under 35 U.S.C. 154(b) by 211 days.

(21) Appl. No.: 15/423,026

(22) Filed: Feb. 2, 2017

(65) Prior Publication Data

US 2017/0148040 A1    May 25, 2017

Related U.S. Application Data

(63) Continuation of application No. 13/967,148, filed on Aug. 14, 2013, now Pat. No. 9,607,310.

(60) Provisional application No. 61/683,552, filed on Aug. 15, 2012.

(51) Int. Cl.
*G06Q 30/00* (2012.01)
*G06Q 30/02* (2012.01)

(52) U.S. Cl.
CPC ..... *G06Q 30/0202* (2013.01); *G06Q 30/0205* (2013.01); *G06Q 30/0206* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 5,774,873 A | 6/1998 | Berent et al. | |
| 6,006,201 A | 12/1999 | Berent et al. | |
| 6,611,726 B1 | 8/2003 | Crosswhite | |
| 7,050,982 B2 | 5/2006 | Sheinson | |
| 7,184,974 B2* | 2/2007 | Shishido | G06Q 30/06 705/26.62 |
| 7,219,080 B1 | 5/2007 | Wagoner et al. | |
| 7,366,679 B2* | 4/2008 | Yuyama | G06Q 30/0202 705/7.31 |
| 7,624,065 B2 | 11/2009 | Schoen et al. | |
| 7,730,019 B1* | 6/2010 | Graham | G06Q 10/04 |
| 7,835,982 B2 | 11/2010 | Schoen et al. | |
| 7,921,052 B2 | 4/2011 | Dabney et al. | |

(Continued)

OTHER PUBLICATIONS

International Search Report and Written Opinion issued for PCT Application No. PCT/US2013/054986, dated Mar. 25, 2014, 7 pages.

(Continued)

*Primary Examiner* — Alan S Miller
(74) *Attorney, Agent, or Firm* — Sprinkle IP Law Group

(57) ABSTRACT

Systems, methods and computer program products for forecasting future values of an item, where an initial value for the item is determined, and then a baseline forecast for a future reference period is computed based on factors that include microeconomic data which is specific to an industry of the item and macroeconomic data which is non-specific to the industry of the item. The forecast may also be adjusted based on data for a set of competitive items. The forecast for the item is stored and is then made available to clients that can access the forecast to determine the expected future value of the item at some point in the future.

20 Claims, 5 Drawing Sheets

(56) References Cited

U.S. PATENT DOCUMENTS

| | | | | |
|---|---|---|---|---|
| 8,090,642 | B1* | 1/2012 | Van Doren | G06Q 40/00 705/35 |
| 8,112,325 | B2 | 2/2012 | Foy et al. | |
| 8,126,881 | B1 | 2/2012 | Sethi et al. | |
| 8,214,275 | B1* | 7/2012 | An | G06Q 20/201 705/20 |
| 8,230,362 | B2 | 7/2012 | Couch | |
| 8,326,845 | B2 | 12/2012 | Sethi et al. | |
| 8,375,037 | B2 | 2/2013 | Sethi et al. | |
| 8,442,908 | B2 | 5/2013 | Niccolini et al. | |
| 8,498,915 | B2 | 7/2013 | Eder | |
| 8,521,619 | B2 | 8/2013 | Perry, III et al. | |
| 8,538,828 | B2 | 9/2013 | Skutta | |
| 8,589,212 | B2 | 11/2013 | Pollak et al. | |
| 8,595,079 | B1* | 11/2013 | Raines | G06Q 30/0201 705/26.1 |
| 8,595,082 | B2 | 11/2013 | Skutta | |
| 8,645,193 | B2* | 2/2014 | Swinson | G06Q 10/06 705/7.35 |
| 8,661,403 | B2* | 2/2014 | Sullivan | G06Q 30/0202 717/100 |
| 8,738,388 | B1* | 5/2014 | An | G06Q 50/16 705/1.1 |
| 8,818,881 | B2 | 8/2014 | Himmerick et al. | |
| 8,868,572 | B2 | 10/2014 | Sethi et al. | |
| 9,103,743 | B2 | 8/2015 | Couch | |
| 9,104,718 | B1 | 8/2015 | Levy et al. | |
| 9,189,960 | B2 | 11/2015 | Couch et al. | |
| 9,324,104 | B1 | 4/2016 | Levy et al. | |
| 9,347,758 | B2 | 5/2016 | Berent et al. | |
| D765,089 | S | 8/2016 | Agee | |
| 9,412,203 | B1 | 8/2016 | Garcia, III et al. | |
| 9,465,873 | B1 | 10/2016 | Franke et al. | |
| 9,466,079 | B2 | 10/2016 | Hygema et al. | |
| D774,523 | S | 12/2016 | Agee | |
| D774,524 | S | 12/2016 | Agee | |
| 9,600,822 | B2 | 3/2017 | Pyle et al. | |
| 9,607,310 | B2 | 3/2017 | Strauss et al. | |
| 2002/0072958 | A1 | 6/2002 | Yuyama | |
| 2002/0077792 | A1* | 6/2002 | Qiu | G06Q 30/02 703/2 |
| 2002/0123951 | A1 | 9/2002 | Olsen et al. | |
| 2002/0198822 | A1 | 12/2002 | Munoz et al. | |
| 2003/0065532 | A1* | 4/2003 | Takaoka | G06Q 30/06 705/80 |
| 2003/0105728 | A1* | 6/2003 | Yano | G06Q 10/06 705/400 |
| 2004/0148241 | A1* | 7/2004 | Qi | G06Q 40/06 705/36 R |
| 2005/0182673 | A1* | 8/2005 | Marzian | G06Q 30/02 705/7.29 |
| 2005/0256760 | A1* | 11/2005 | Siddhanti | G06Q 10/06315 705/7.25 |
| 2006/0129423 | A1 | 6/2006 | Sheinson et al. | |
| 2006/0178973 | A1 | 8/2006 | Chiovari et al. | |
| 2007/0185777 | A1 | 8/2007 | Pyle et al. | |
| 2009/0006118 | A1 | 1/2009 | Pollak | |
| 2009/0144122 | A1 | 6/2009 | Ginsberg | |
| 2009/0157522 | A1* | 6/2009 | Srinivasan | G06Q 30/00 705/26.1 |
| 2009/0177520 | A1 | 7/2009 | Bateni | |
| 2010/0070344 | A1* | 3/2010 | Taira | G06Q 10/067 705/400 |
| 2010/0088158 | A1 | 4/2010 | Pollak | |
| 2010/0181408 | A1 | 6/2010 | Karson et al. | |
| 2010/0274571 | A1 | 10/2010 | McFall et al. | |
| 2010/0274631 | A1 | 10/2010 | McFall et al. | |
| 2010/0318451 | A1 | 12/2010 | Niccolini et al. | |
| 2011/0022525 | A1* | 1/2011 | Swinson | G06Q 30/0278 705/306 |
| 2011/0082804 | A1* | 4/2011 | Swinson | G06Q 30/02 705/306 |
| 2011/0131652 | A1 | 6/2011 | Robinson et al. | |
| 2011/0178953 | A1 | 7/2011 | Johannes | |
| 2011/0202471 | A1 | 8/2011 | Scott et al. | |
| 2011/0320414 | A1* | 12/2011 | Sim | G06F 16/95 707/690 |
| 2012/0005070 | A1 | 1/2012 | McFall et al. | |
| 2012/0233014 | A1 | 9/2012 | Banks et al. | |
| 2012/0284087 | A1 | 11/2012 | Pollak | |
| 2012/0284113 | A1 | 11/2012 | Pollak | |
| 2013/0191247 | A1 | 7/2013 | Huang et al. | |
| 2013/0339173 | A1 | 12/2013 | Skutta | |
| 2014/0012901 | A1* | 1/2014 | Ruhl | G06Q 10/06 709/203 |
| 2014/0032352 | A1 | 1/2014 | Fraser et al. | |
| 2014/0032353 | A1 | 1/2014 | Fraser et al. | |
| 2014/0058795 | A1 | 2/2014 | Strauss | |
| 2014/0067615 | A1 | 3/2014 | Park et al. | |
| 2014/0089208 | A1 | 3/2014 | Humble et al. | |
| 2014/0207705 | A1 | 7/2014 | Strauss et al. | |
| 2014/0229391 | A1 | 8/2014 | East, III et al. | |
| 2014/0257934 | A1 | 9/2014 | Chrzan et al. | |
| 2014/0258044 | A1 | 9/2014 | Chrzan et al. | |
| 2014/0278806 | A1 | 9/2014 | Duguid et al. | |
| 2014/0279020 | A1 | 9/2014 | Duguid et al. | |
| 2014/0279171 | A1 | 9/2014 | Burgiss et al. | |
| 2014/0279229 | A1 | 9/2014 | Burgiss et al. | |
| 2014/0279275 | A1 | 9/2014 | Burgiss et al. | |
| 2014/0351074 | A1 | 11/2014 | Enge et al. | |
| 2015/0058152 | A1 | 2/2015 | Pollak et al. | |
| 2015/0206206 | A1 | 7/2015 | Puente et al. | |
| 2015/0220876 | A1 | 8/2015 | Sethi et al. | |
| 2015/0221040 | A1 | 8/2015 | Strauss et al. | |
| 2015/0324737 | A1 | 11/2015 | Chrzan et al. | |
| 2015/0324879 | A1 | 11/2015 | Lu et al. | |
| 2015/0356672 | A1 | 12/2015 | Humble et al. | |
| 2016/0343058 | A1 | 11/2016 | Levy et al. | |
| 2016/0371323 | A1 | 12/2016 | Garcia, III et al. | |
| 2018/0033030 | A1 | 2/2018 | Hansen et al. | |

OTHER PUBLICATIONS

Office Action issued for U.S. Appl. No. 14/031,846, dated Oct. 2, 2014, 12 pages.

Office Action issued for U.S. Appl. No. 13/967,148, dated Apr. 14, 2015, 10 pages.

Office Action issued for U.S. Appl. No. 14/031,846, dated May 4, 2015, 7 pages.

International Preliminary Report on Patentability (IPRP) issued for PCT Application No. PCT/US2013/054986, dated Jun. 18, 2015, 6 pages.

Final Office Action issued for U.S. Appl. No. 14/031,846, dated Aug. 6, 2015, 19 pages.

Bankrate [Retrieved from <<https://web.archive.org/web/20111224082852/http://www.bankrate.com/finance/auto/what-factors-affect-car-resale-value-1.aspx>>], Wayback Machine, Dec. 11, 2011, 3 pages.

Office Action issued for U.S. Appl. No. 13/967,148, dated Sep. 22, 2015, 24 pages.

Office Action issued for Canadian Patent Application No. 2,881,812, dated Apr. 20, 2016, 4 pages.

Extended European Search Report issued for European Patent Application No. 13829187.7, dated Apr. 25, 2016, 6 pages.

Office Action issued for U.S. Appl. No. 13/967,148, dated May 17, 2016, 22 pages.

Extended European Search Report issued for European Patent Application No. 17195907.5, dated Dec. 4, 2017, 7 pages.

Office Action issued for U.S. Appl. No. 14/031,846, dated Dec. 19, 2017, 18 pages.

Office Action issued for U.S. Appl. No. 14/689,751, dated Jan. 25, 2018, 18 pages.

Office Action issued for Canadian Patent Application No. 2,881,812, dated Jan. 30, 2018, 5 pages.

Summons to Attend Oral Proceedings issued for European Patent Application No. 13829187.7. dated Feb. 2, 2018, 8 pages.

Office Action issued for U.S. Appl. No. 14/031,846, dated May 5, 2017, 17 pages.

(56) References Cited

OTHER PUBLICATIONS

Office Action issued for European Patent Application No. 13829187.7, dated May 12, 2017, 5 pages.
Office Action issued for U.S. Appl. No. 14/031,846, dated Aug. 31, 2017, 17 pages.
Office Action issued for U.S. Appl. No. 14/689,751, dated Oct. 6, 2017, 14 pages.
Office Action issued for U.S. Appl. No. 15/729,719, dated Nov. 20, 2018. 12 pages.
Notice of Allowance issued for U.S. Appl. No. 15/729,719, dated May 20, 2019, 9 pages.

* cited by examiner

SYSTEM, METHOD, AND COMPUTER PROGRAM FOR FORECASTING RESIDUAL VALUES OF A DURABLE GOOD OVER TIME

CROSS-REFERENCE TO RELATED APPLICATION(S)

This application is a continuation of and claims a benefit of priority under 35 U.S.C. 120 of the filing date of U.S. patent application Ser. No. 13/967,148, filed Aug. 14, 2013, entitled "SYSTEM, METHOD AND COMPUTER PROGRAM FOR FORECASTING RESIDUAL VALUES OF A DURABLE GOOD OVER TIME," issued as U.S. Pat. No. 9,607,310, which claims a benefit of priority from U.S. Provisional Application No. 61/683,552, filed Aug. 15, 2012, entitled "SYSTEM, METHOD AND COMPUTER PROGRAM FOR FORECASTING RESIDUAL VALUES OF A DURABLE GOOD OVER TIME," which are hereby incorporated by reference as if set forth herein in their entirety.

TECHNICAL FIELD

This disclosure relates generally to forecasting future market value of durable goods, and more particularly to systems, methods and computer program products for forecasting the value of an item using microeconomic, macroeconomic, and competitive set information and updating the forecast value at predetermined time intervals.

BACKGROUND OF THE RELATED ART

The market value of an item is known at the time that it is sold to a consumer. After this initial transaction, however, the value of the item will decline. The amount by which the value decreases may depend upon many factors, such as the amount of time that has passed since the original sale, the amount of wear experienced by the item, and so on.

Because of the difficulty of determining these factors with any certainty, the value of an item after its initial sale is conventionally determined by resale values of the item. For instance, the value of a two-year-old automobile is determined by examining the prices for which similarly equipped automobiles of the same make, model and year have actually sold. While some adjustments may be made to these values (e.g., for vehicle mileage above or below some average range), determination of the automobile's value generally relies on past resale prices of the same vehicle.

Since these conventional methods of determining the value of an item are relatively simplistic and take into account only backward-looking data (e.g., past sales of the item), they are not as accurate as may be desired. For instance, an automobile leasing company may need to know the future value of the automobiles that it owns in order to obtain financing for expansion or other business transactions. It would therefore be desirable to provide improved methods for determining the future value of such items.

SUMMARY OF THE DISCLOSURE

This disclosure is directed to systems, methods and computer program products for forecasting future values of an item that solve one or more of the problems discussed above. One particular embodiment is a system for forecasting future values of an item, where the system includes a server computer coupled to a network and a local data storage device coupled to the server computer. The server computer is configured to receive data from one or more data sources external to the system. The server computer determines an initial value for an item, and then determines forecasted future values for the item which are adjusted based on microeconomic data which is specific to an industry of the item and macroeconomic data which is non-specific to the industry of the item. The server computer stores the forecasted future values in the local data storage device and enables access by a user to the forecasted future values. The server computer can modify the forecasted future values based on editorial input provided by the user and store the modified values in the local data storage device. The server computer can enable access by a client device to the modified forecasted future values through the network.

The server computer may be configured to receive and store competitive set data, and to modify the one or more future values based on the competitive set data. The server computer may have one or more crawlers that are configured to query the data sources via the network and to obtain data responsive to the queries. The server computer may be configured to scrub the data received from the data sources, and may identify and remove erroneous data. The server computer may be configured to determine one or more update intervals, to update the future values at the determined intervals, and to store the updated future values. The system may include a workbench that provides a user interface through which a user can access the future values, where the server modifies the future values based on input provided by the user through the workbench.

An alternative embodiment comprises a method for forecasting future values of an item. The method includes receiving data from one or more data sources via a network and determining an initial value for an item based on the received data. One or more future values are then determined for the item, where the future values are adjusted based on microeconomic data which is specific to the item's industry and macroeconomic data which is non-specific to the industry. The future values are then stored in a data storage device, and access to the future values by a user is enabled. The future values may be modified based on editorial input provided by a user. The modified future values may be stored in the data storage device, and access by a client device to the modified future values may be enabled.

Another alternative embodiment comprises a computer program product including a non-transitory computer-readable storage medium that stores computer instructions. The instructions are translatable by a processor to perform a method. The method may include receiving data from one or more data sources via a network and determining an initial value for an item based on the received data. One or more future values are then determined for the item, where the future values are adjusted based on microeconomic data which is specific to the item's industry and macroeconomic data which is non-specific to the industry. The future values are then stored in a data storage device, and access to the future values by a user is enabled. The future values may be modified based on editorial input provided by a user. The modified future values may be stored in the data storage device, and access by a client device to the modified future values may be enabled.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
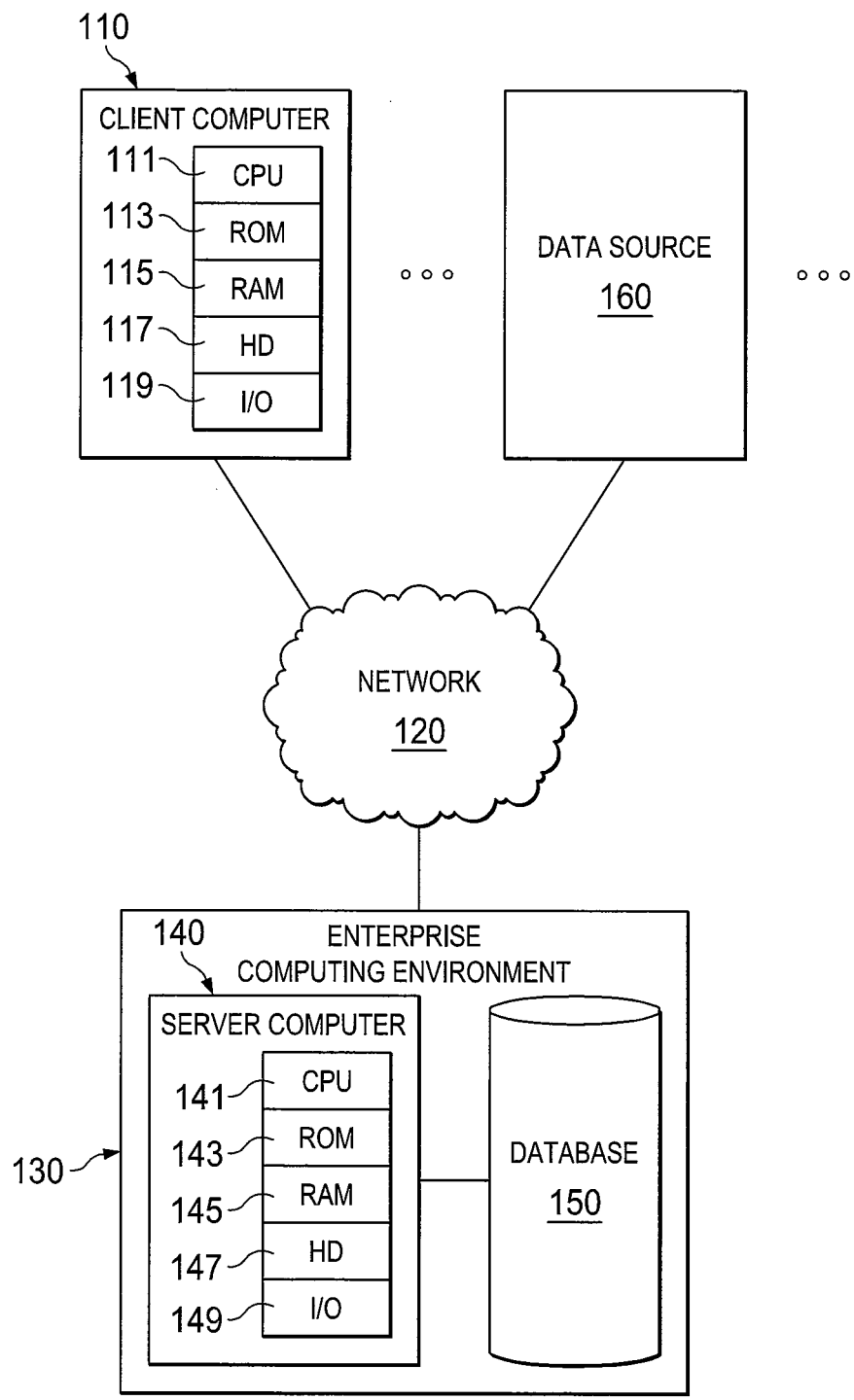
FIG. 1 is a diagram illustrating the structure of an exemplary system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

For the purposes of this disclosure, the term "item" may be used to refer to a durable good, product, or any item that has a known value at the time it was first sold and that has a different resale value over time thereafter. Examples of an item may include a vehicle, a real estate property, etc.

For a durable good or product (an "item"), the resale value of the item may be affected by various factors such as time, the availability of same or similar items, the geographical location where the item physically resides, demand in for the item in the resale market and/or industry, the purchasing power of the target buyers, and so on. An ability to determine the amount by which the item will change (e.g., devalue) over time, and thereby forecast the resale or residual value of the item can provide a better understanding of a company's assets and can allow the company to make better business decisions.

Embodiments disclosed herein provide a methodology for forecasting residual values of an item in two time periods and determining changes in value in a valuation metric. By estimating the changes in value for successive future time intervals, a function can be constructed to capture the estimated relationship between time and the item's value. Implementing the methodology, embodiments provide a model which can predict the residual value of an item at a future time point for any time period. In one embodiment, the current market value of an item at the beginning of an estimation period is known and can be used as a baseline against which future values are computed. The farther away in time a forecast is relative to the baseline, the more uncertainty will exist. Thus, the forecasting error will grow as the width of the time interval increases.

Taking this uncertainty into consideration, embodiments utilize different types of variables to aid in forecasting residual values of an item over time. Example types of forecasting variables include, but are not limited to, modifications to the items, locality of the items, depreciation of the items, microeconomic factors, macroeconomic factors, and sets of competitive items. These factors will be discussed in more detail below.

Referring to FIG. 1, a diagram illustrating the structure of an exemplary system in accordance with one embodiment is shown. FIG. 1 is a simplified diagrammatic representation of a network architecture 100 in which this embodiment is implemented. For purposes of clarity, a single client computer, a single server computer, and a single data source are shown in the figure. The client and server computers and data source represent an exemplary hardware configuration of data processing systems that are capable of bi-directionally communicating with each other over a public network such as the Internet. Those skilled in the art will appreciate that enterprise computing environment 130 may comprise multiple server computers, and multiple client computers and data sources may be bi-directionally coupled to enterprise computing environment 130 over network 120.

Client computer 110 can include central processing unit ("CPU") 111, read-only memory ("ROM") 113, random access memory ("RAM") 115, hard drive ("HD") or storage memory 117, and input/output device(s) ("I/O") 119. I/O 119 can include a keyboard, monitor, printer, and/or electronic pointing device. Example of I/O 119 may include mouse, trackball, stylus, or the like. Client computer 110 can include a desktop computer, a laptop computer, a personal digital assistant, a cellular phone, or nearly any device capable of communicating over a network. Server computer 140 may have similar hardware components including CPU 141, ROM 143, RAM 145, HD 147, and I/O 149. Data source 160 may be a server computer having hardware components similar to those of client computer 110 and server computer 130, or it may be a data storage device.

Each computer shown in FIG. 1 is an example of a data processing system. ROM 113 and 143, RAM 115 and 145, HD 117 and 147, and database 150 can include media that can be read by CPU 111 and/or 141. Therefore, these types of computer memories include computer-readable storage media. These memories may be internal or external to computers 110 and/or 140.

Portions of the methods described herein may be implemented in suitable software code that may reside within ROM 143, RAM 145, HD 147, database 150, or a combination thereof. In some embodiments, computer instructions implementing an embodiment disclosed herein may be stored on a direct access storage device (DASD) array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by CPU 141 to perform an embodiment of a method disclosed herein.

In an illustrative embodiment, the computer instructions may be lines of compiled C++, Java, or other language code. Other architectures may be used. For example, the functions of server computer 140 may be distributed and performed by multiple computers in enterprise computing environment 130. Accordingly, each of the computer-readable storage media storing computer instructions implementing an embodiment disclosed herein may reside on or accessible by one or more computers in enterprise computing environment 130.

Figure 2:
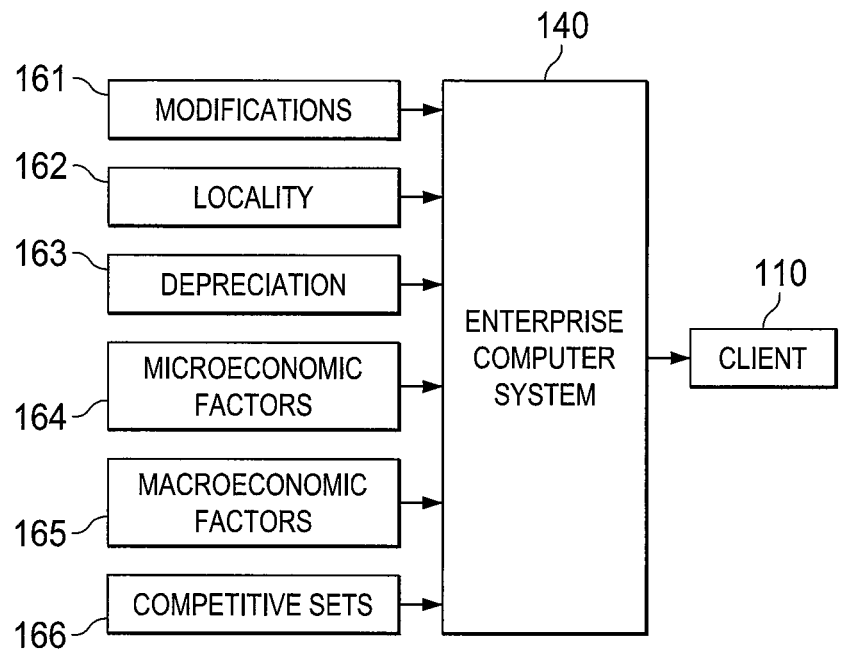
FIG. 2 is a diagram illustrating the collection of different types of data that are collected by the system of one embodiment.
Figure 3:
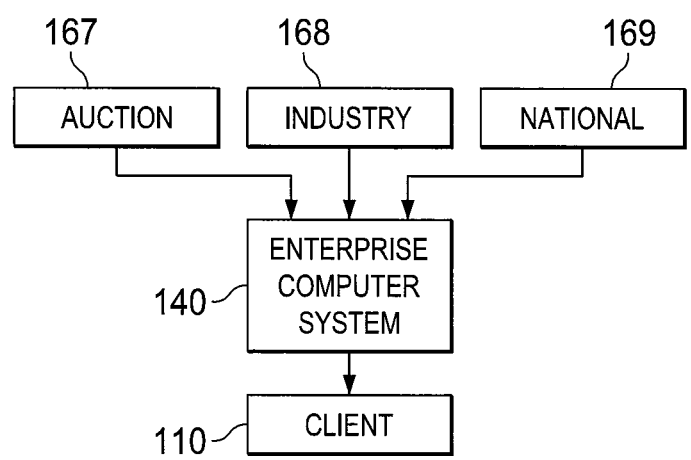
FIG. 3 is a diagram illustrating the collection of data from different data sources in the system of one embodiment.

As noted above, the present systems and methods utilize not only depreciation and other conventionally employed information to determine the future value of an item, but also microeconomic information, macroeconomic information and information on sets of competitive items. Referring to FIGS. 2 and 3, a pair of diagrams illustrating the collection of this information is shown. FIG. 2 illustrates the different types of data that are collected by the present system, while FIG. 3 illustrates the different sources from which the data is typically collected.

As depicted in FIG. 2, server 140 collects data types 161-166. Data types 161-163 represent information that is collected by the server. Data types 161-163 represent information that is related to past sales of similar items. The past sales indicate the amount of depreciation that the similar items have experienced from their original value to resale, and also indicate the effects of modifications and locality on resale value. Data sources 164-166, on the other hand, represent types of information that are not conventionally collected for use in determining the future value of an item. These data sources represent information that indicates how the value of the item will be impacted in the future, rather than how it was affected in the past.

Modifications 161 reflect any changes to an item i that may affect its value at any time point. Examples of modifications ($M_i$) include options added to the item in prior periods, different configurations/styles of the item, or other features which may distinguish one item from another that is produced by the same manufacturer.

Locality 162 represents valuation differences in an industry (p) that vary geographically. Examples of Locality ($L_p$) would include adjustments to equalize sales of the essentially identical items made in different locations, allowing valuation to be conducted, for instance, at both the national and state/province levels.

Depreciation 163 represents the natural change in value that occurs as the item i is used over time. Depreciation ($D_i$) can be determined from past sales of the item.

Microeconomic information 164 is specific to the industry p of the item i (i∈p). For example, microeconomic factors ($G_p$) may include supply and/or demand in the industry, industry trends, seasonality and/or volatility of the item, or information about a company that is in the industry.

Macroeconomic information 165 is non-specific to the item and its industry. Macroeconomic factors (F) may relate to the overall economy, rather than to the specific industry with which the item i is associated (e.g., the real estate or automotive industries). Examples of macroeconomic information may include inflation, unemployment, and interest rates.

Competitive set information 166 relates to a set of items that compete with the item of interest. Competitive sets ($C_{iU}$) include all other items, j=1, . . . , J (i≠j), in the same industry p and in the competitive set U (i, j∈U∀j) which are reasonable substitutes for the item i being valued. Examples of competitive items j may include items produced by different manufacturers that share similarities with the item i being valued and also sales incentives applied to the item i being valued or its substitutes. Competitive set information may include such information as sales or recall information for competing items.

Referring to FIG. 3, typical sources for data types 161-166 are shown. Depreciation, modification and locality data types are commonly obtained from data sources that are associated with auctions or wholesalers (167) dealing in the item of interest. Microeconomic information and data on competitive sets associated with the item of interest are commonly obtained from industry databases (168). Macroeconomic information may be obtained from databases or other sources associated with national economics (169).

Referring to FIGS. 4-7, a set of flow diagrams is shown. The diagrams illustrate a method for forecasting the future value of an item and enabling access by a client to the forecast in accordance with one embodiment. The method may be implemented, for example, in a system such as the one shown in FIG. 1. It should be noted that the particular steps illustrated in the figures are exemplary, and the steps of alternative embodiments may vary from those shown in the figures.

Figure 4:
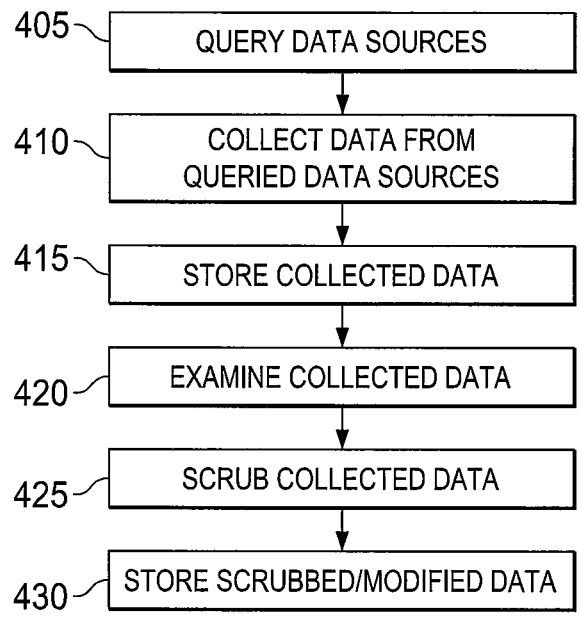
FIG. 4 is a flow diagram illustrating the acquisition of data used in the generation of a forecast for an item in one embodiment.

Referring to FIG. 4, a flow diagram illustrating the acquisition of data used in the generation of a forecast for an item is shown. The server initially queries one or more data sources for information (405). The data sources may include both data storage units internal to the enterprise computing environment and data sources external to the enterprise computing environment. In one embodiment, the enterprise computing environment may have crawlers that query external data sources, searching for information relevant to the forecast. The server collects the data (410) and stores the data for further processing (415). The data that is collected is examined by the server (420) and processed to identify portions of the data that will be used to generate the forecast. The data may be "scrubbed" by the server (425) in order to provide a better basis for the forecast. The scrubbing process may involve various techniques to improve the quality of the data, such as identifying data that appears to be in error, removing outlying data points that substantially deviate from the remainder of the data, and so on. The data may also be filtered or examined to identify particular fields or types of data within the data that has been collected by the system. Still further, the system may transform all or part of the collected data into forms that are suitable for use by the system. After the desired data has been selected and scrubbed, if necessary, the modified data set is stored (430) in a local data storage device, from which it can be retrieved and used in the generation of the forecast.

Figure 5:
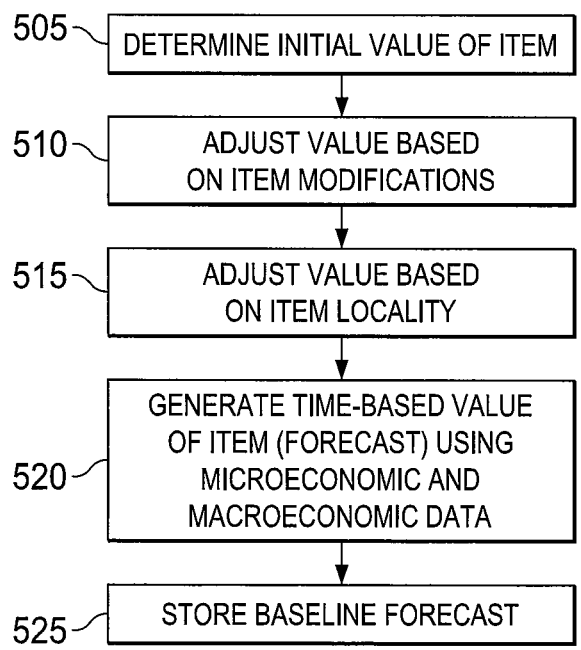
FIG. 5 is a flow diagram illustrating the generation of a baseline forecast in one embodiment.
Figure 8:
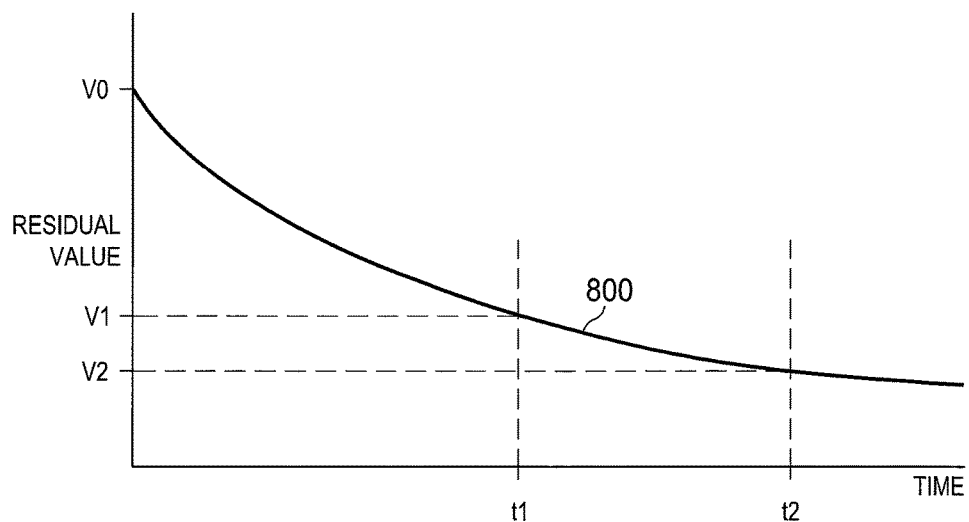
FIG. 8 is a diagram illustrating an exemplary baseline forecast or residual curve.

Referring to FIG. 5, a flow diagram illustrating the generation of a baseline forecast is shown. The server first determines an initial value for the item of interest (505). This value is commonly determined based upon past sales of the item. The server then adjusts the value of the item to account for modifications to the item that may affect its value (510). For instance, if the item has been upgraded in some manner, its value may have increased. The server may also adjust the value to account for things such as excessive wear on the item. The server may further adjust the value of the item to account for locality (515). The locality of the item may impact its value for various reasons, such as differing demand in different areas, different levels of wear in the different locations, etc. Using this initial value of the item, the server then generates a time-based value for the item which takes into account the depreciation of the item, as well as various microeconomic and macroeconomic factors (520). The microeconomic and macroeconomic factors effectively increase or decrease the rate of depreciation, depending upon the specific information that is taken into account. The resulting forecast of the value of the item over time is stored in a local data storage device (525) as a baseline for distribution or further adjustment. An exemplary baseline forecast or residual curve 800 is illustrated in FIG. 8.

Figure 6:
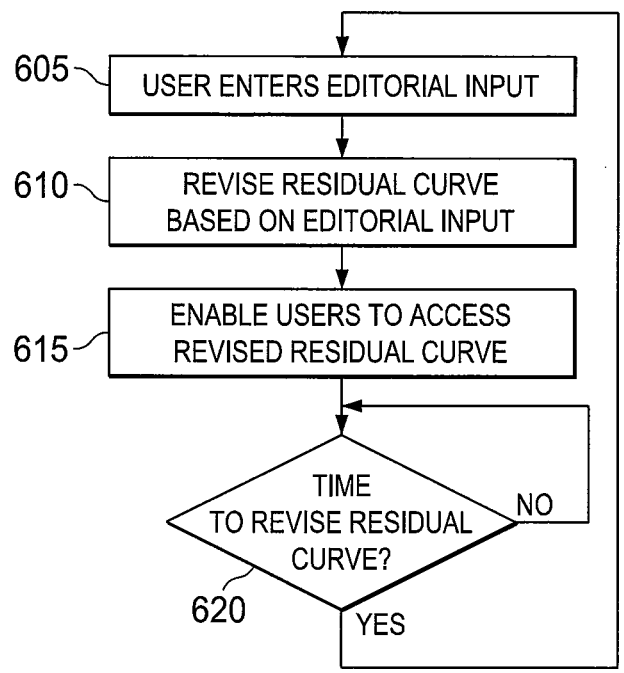
FIG. 6 is a diagram illustrating the adjustment of a baseline curve in one embodiment.

Referring to FIG. 6, a flow diagram illustrating the adjustment of a baseline curve is shown. After the baseline residual curve has been generated and stored in a local data storage device, a user of the enterprise computing environment can provide editorial input (605) that is used to revise the residual curve (610). The editorial input may be provided to account for any factors that were not accounted for in the generation of the baseline curve, or that have changed since the baseline curve was generated. The editorial input may also be provided to determine the potential affect of various factors on the residual curve. The editorial input may be provided through a workbench application that allows the user to see the results of the input. The residual curve that is revised according to the editorial input can then be made "live" (615). In other words, the revised residual curve can be stored or published to a location to which client access can be enabled. It may be desirable to periodically revise the residual curve. If it is time to do so (620) (e.g., if a predetermined interval has been reached), the user can provide additional editorial input (605) for generation of a newly revised residual curve (610), which can then be published for access by the client (615).

Figure 9:
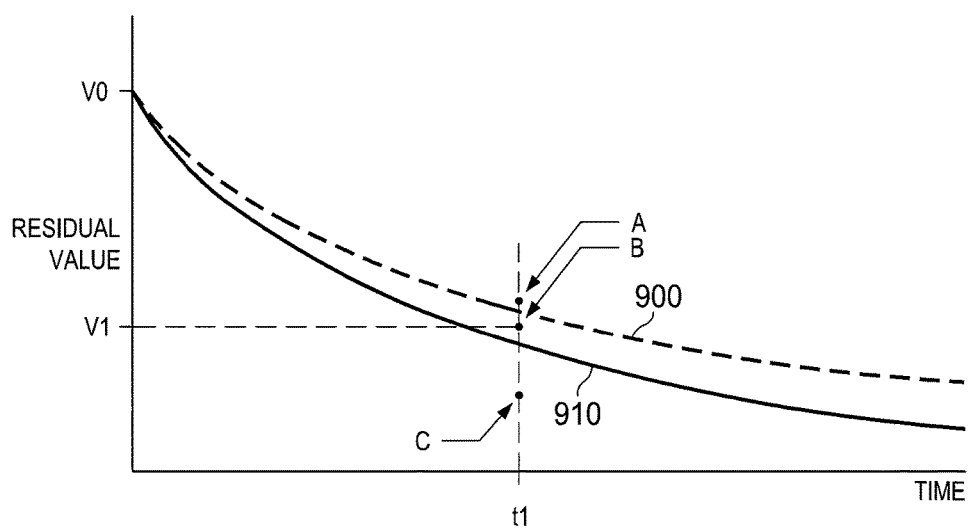
FIG. 9 is a diagram illustrating an exemplary residual curve adjustment in one embodiment.

In one embodiment, the residual curve is updated at regular intervals. The updated residual curve can be stored in place of the previous baseline curve and used as the baseline for future use. When the residual curve is updated, several comparisons are made to ensure that the newly revised curve is reasonable. For example, the revised curve is compared to the previous curve to determine whether the values of the new curve differ from the previous curve by a substantial amount. If the difference is too great, this may indicate that the inputs to the revised curve are not realistic. The inputs may therefore be adjusted to bring the revised residual curve closer to the previous curve. In one embodiment, the residual curve is also adjusted based on the current values of items in a competitive set. For instance, the curve may be adjusted to bring the curve closer to the value of a closest competitive item, or to the average value of the set of competitive items. Referring to FIG. 9, an exemplary residual curve adjustment is shown. In this figure, the dotted line (900) represents the initial computation of the curve. Points A, B, and C represent the average residual values of the competitive set, the current market value of the best matching item in the competitive set, and the previous value of the item of interest, respectively. Taking these data points into account, the final revised residual curve is shown as line 910.

Figure 7:
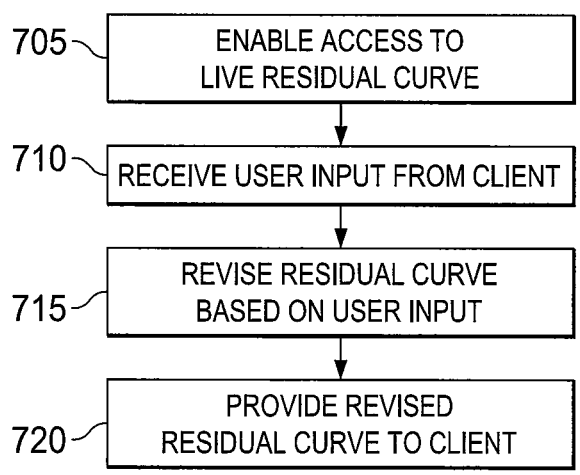
FIG. 7 is a flow diagram illustrating the adjustment of a residual curve by a client in one embodiment.

Referring to FIG. 7, a flow diagram illustrating the adjustment of a residual curve by a client is shown. After the baseline residual curve is revised by the editorial input, the server can enable access by the client to the revised curve (705). Customers can access the residual curve through the client in order to determine the value of the item at some point in the future. The client in this embodiment includes a workbench application that allows the customer to vary some of the factors that affect the residual curve and to view the resulting changes to the residual curve. The server receives input from the client's workbench application (710) and revises the residual curve according to the received input (715). The newly revised residual curve is then provided to the client (720) so that it can be viewed by the customer.

In one embodiment, the residual values of an item i ($V_{i,n}$) may be expressed in an equation below as a function of time $t_n$ (n=0, ..., T):

$$V_{i,n} = (V'_{i,0} + M_{i,n}) \times (\tau_{i,n} \times L_{p,n}) \times D_{j,n|0} + (F_{\cdot,n|n-h} + G_{k,n|n-h}) + C_{iU,n|n*}, h=1, \ldots, H$$

In the above equation, "F." implies that the macroeconomic factors are taken over all p=1, ..., P and "n*" pertains to period $t_n^*$ defined as a reference period, $t_n^*$, at which adjustments will be made to align values with other items in the competitive set. Further, $V'_{i,0}$ represents the market value at time $t_0$ before modifications, reflecting the level of the base configuration of item i at period $t_0$, prior to modifications and locality adjustments, $V_{i,n}$ reflects the level of the variable for the item i at period $t_n$, $L_{p,n}$ reflects the locality adjustment made at time $t_n$ to all items $i_n$ for industry p (i∈P), $F_{\cdot,n|n-h}$ reflects the level of a macroeconomic (neither industry-nor item-specific) variable at period $t_n$, given the historical information about that the variable in the last=1, ..., H periods ($t_{n-1}, t_{n-2}, \ldots, t_{n-H}$), $G_{p,n|n-h}$ reflects the level of the microeconomic variable at period $t_n$ given the historical information for industry p (i∈p) available about that variable in the last=1, ..., H periods ($t_{n-1}, t_{n-2}, \ldots, t_{n-H}$), $D_{1,n|0}$ reflects the observed natural depreciation for another item j in the same competitive set as item I at time period $t_0$, $C_{iU,n|n*}$ reflects a competitive set adjustment made to item i based at time period $t_{n*}$ based on an observed discrepancy between $V_{i,n}$ and the predicted values of all other items, j=1, ..., J (i≠j) in the competitive set U (i, j∈U∀j) evaluated at some reference period, $t_n$.

Following is an exemplary methodology that can be used to estimate the value of an item over time, thereby providing the resale value of the item that could be expected at future time points.

In this embodiment, a method for forecasting residual values of an item begins with determining a baseline value of an item. The baseline value of the item can be an unmodified value for the item that is obtained through direct observation of the current market values. If the baseline value cannot be determined or obtained directly for the item, a competitive set of similar and substitute items in the same industry as the item may be constructed. The item in the competitive set that is the most similar to the item of interest (the item being evaluated) can be selected as a substitute and its value can be used as the baseline value for the item. This baseline value reflects the market information across localities in which the item is available.

The method further includes determining, at an initial time point $t_0$, a reference period at which adjustments are made to align the baseline value of the item with values of other items in a competitive set of similar and substitute items in the same industry as the item. In one embodiment, this competitive set can be the same competitive set used in selecting a substitute item whose value is used as the baseline value for the item under evaluation. The reference period may be determined utilizing a set of constraints and/or considerations. Example constraints and considerations may include the expected lifespan for the item, the purpose for obtaining the residual value of the item, how often input data to the model (for predicting the residual value of the item at a future time point for any time period) is updated, etc. As an example, suppose the initial time point is Jul. 9, 2012 and input data to the model is updated on a monthly basis, the reference period could then be Jul. 9, 2012 to Aug. 9, 2012, Jul. 9, 2012 to Sep. 9, 2012, Jul. 9, 2012 to Oct. 9, 2012, etc. The reference period can be further constrained by the total expected lifetime of the item. For example, if the item is not expected to retain value after five years, then the reference period can be Jul. 9, 2012 to Jul. 9, 2017, or less (in one or more monthly temporal offsets as constrained by the update frequency of the input data to the model).

Once the reference period has been determined, a number of forecasts desired between the initial time point and the reference period can be determined. This time determines how often a forecast of the residual value of the item is to be generated. Starting from the initial time point, the time interval at which a forecast is to be generated can be the same as, or more than, the update frequency of the input data to the model. Following the above example in which the expected lifespan of the item is five years, if it is assumed that the reference period is two years, there can be, for example, 23 forecasts, each of which is generated at a fixed time interval of one month. If the time interval is selected to be six months, then four forecasts are generated.

With the time interval thus selected, the method further comprises determining a locality adjustment ($L_p$). If the value of the item does not vary by geographic region (the value of the item is the same in the industry across all localities at the initial time period), then no locality adjustment needs to be made. Otherwise, the baseline value of the item at the initial time point $t_0$ may be adjusted by computing a ratio between the average cost of items in the industry in a particular locality at a certain time point $t_n$ and the local cost of items in the industry across all localities at the same time point $t_n$. As an example, consumer price index can be utilized to determine the cost information on items in various industries relative to localities.

The exemplary method further comprises collecting or estimating incremental values of modifications ($M_{i,n}$) to the base value of the item of interest. These modifications can be of various types. One example type can be modifications that are both observable at a particular time $t_n$ and are expected to retain some value in future time period(s) after the particular time $t_n$. Another example type can be modifications that are not observable and/or not expected to retain value after the particular time $t_n$.

With the collected or estimated incremental values of modifications ($M_{i,n}$), the method may further comprise adjusting the base value of the item to account for the modifications and locality adjustments to determine a locality-adjusted value of a modified item ($BV_{i,n}$) at the particular time $t_n$.

The method may further comprise constructing competitive sets of similar and substitute items in the same industry. This construction may involve partitioning all items in the industry into distinct clusters based on a measure of similarity between all pairs of items in the industry. A full explanation of an example competitive set approach is provided in U.S. patent application Ser. No. 13/173,332, filed Jun. 30, 2011, entitled "SYSTEM, METHOD AND COMPUTER PROGRAM PRODUCT FOR PREDICTING ITEM PREFERENCE USING REVENUE-WEIGHTED COLLABORATIVE FILTER," which is fully incorporated herein by reference. Other competitive set approaches may also be possible.

To account for macroeconomic factor(s), the method may further comprise collecting macroeconomic data, $F_{.,n|n-h}$, and either forecasting future levels or incorporating existing forecasts from other sources to determine $\hat{F}_{.,n|n-h}$. Here, "F." implies that the macroeconomic factors are taken over all industries and not specific to any particular industry p. "$\hat{F}$." indicates that it is an estimated value.

To account for microeconomic factor(s), the method may further comprise collecting microeconomic data, $G_{p,n|n-h}$, for the industry p in which the item i being evaluated is classified and either forecasting future levels or incorporating existing forecasts from other sources to determine $\hat{G}_{p,n|n-h}$. Here, each microeconomic factor is specific to the industry p. "$\hat{G}$" indicates that it is an estimated value.

To account for the depreciation ($D_{i,n|0}$) that represents the natural change in value that occurs as the item i is used over time, the method may further comprise using standard accounting definitions as a basis for expressing the relationship between depreciation and time. For example, the natural change in value can represent a linear (straight line) depreciation. If there are no guidelines on building industry-specific depreciation factors or no depreciation information can be obtained or provided by another source, the depreciation factor from another item j in the same competitive set may be used as a substitute.

To compute a residual value for the item i ($\hat{V}'_{i,n}$) at the particular time $t_n$ in one embodiment, the method may comprise solving the equation below using values constructed from the above-described steps.

$$\hat{V}'_{i,n} = BV_{i,n} \times D_{i,n|0} + (\hat{F}_{.,n|n-h} + \hat{G}_{p,n|n-h}) \text{ where } h=1, \ldots, H$$

Although the initial value of the item i, $V_{i,0}$, is known and remains unchanged, the forecasted residual value needn't also remain fixed over time. As new information becomes available, it is possible to employ that additional information to update the forecasted value. This new information may be reflected in the variable types listed above.

In one embodiment, for quality assurance (QA), the forecasted residual values thus determined may be compared with a set of reference values and adjusted by an adjustment value, $C_{iU,n|n^*}$, that will minimize the weighted average error relative to the position implied by the reference points.

As an example, the approach for adjusting $\hat{V}'_{i,n}$ for QA purposes may include the following steps:
Gather residual values from other goods in the competitive set, including, for example:
The average residual value at $t^*_n$ for the entire competitive set $U_k$.
The baseline value $BV_{j,0}$ at $t_0$ for the good j in the same competitive set that is most similar to good i.
The residual value of the good k that is a previous version of good i (not a modification of good i, but the one that was replaced in production by good i), if it exists.
Compute the adjustment value, $C_{iU,n|n^*}$, that will minimizes the weighted average error relative to the position implied by the reference points as follows:

$$C_{iU,n|n^*} = \Delta[(\alpha V_{U,n} + \beta BV_{j,0} + \Gamma V_{k,n}) - V_{i,n}],$$

where $\alpha$, $\beta$, $\Gamma$ are assigned weights, $\alpha+\beta+\Gamma=1$ and $\alpha, \beta, \Gamma > 0$, $\Delta$ is a weight depending on whether good i at $t_n$ is completely new in the market ($\Delta=1$) or established ($\Delta<1$).

Adjusting $\hat{V}'_{i,n}$ by $C_{iU,n|n^*}$ produces the final forecasted residual value for the item i:

$$\hat{V}_{i,n} = BV_{i,n} \times D_{j,n|0} + (\hat{F}_{n|n-h} + \hat{G}_{k,n|n-h}) + C_{iU,n|n^*}, h=1, \ldots, H$$

Those skilled in the art will appreciate that embodiments disclosed herein can apply to all types of items that are not immediately consumed and that retain some non-negative value over time. The variable types disclosed herein and are intended to encompass the various components required to value an item in any industry p and the microeconomic ($G_p$), Locality ($L_p$), and competitive sets ($C_{iU}$) components will be specific to that industry class pertaining to the item i that is being valued as long as all other items or members, j=1, ..., J, of the competitive set U are in the same industry, p, as item i.

Embodiments disclosed herein can provide many advantages. For example, knowledge of the future residual values can be used to:

a) Set leasing rates of an item which reflect the expected change in valuation of the item between the beginning and ends of a fixed lease period—a useful metric that can be used in the rental industry.
b) Determine the amount at which an item can be resold at any time period—a useful metric that can be used in investment decisions such as real estate.
c) Provide information supporting the strategic planning decisions made of the manufacturer of good i.
d) Determine if the change in value will be constant over time intervals of the same length.

Example Implementation in Automotive Industry

The following describes an exemplary implementation in which the approach described above is adapted to be used to estimate the value of automobiles over time and thereby allows the resale values that could be expected at future time points to be determined. Residual values thus estimated can provide guidelines for pricing fixed-term vehicle leases which captures the expected change in value that will result in the time interval between the leased vehicle's acquisition at time $t_0$ and its disposition at time $t_d$. This example implementation not only can provide the estimated residual value at disposition, $V_{i,d}$, but can also forecast values at equally-spaced fixed points between $t_0$ and $t_d$, thereby allowing construction of a residual curve that captures the relationship between vehicle value and time. Over time and as new information becomes available, this example implementation allows a company to update their forecasts to reflect changing values of exogenous macroeconomic and industry-specific microeconomic variables and vehicle-specific, endogenous variables (depreciation, competitive sets, and modifications). In this example implementation, the guidelines for production of the residual values include:

The residual values must be realistic and adjusted over the vehicle's lifecycle to reflect the market, incentives and fleet purchases.

To enable vehicle manufacturers to market their vehicles, residual values must create clear, consistent messages across all vehicles being valued.

To remain relevant and timely, the residual values must reflect product enhancements, packaging/content adjustments, etc.

To provide utility to each manufacturer's ecosystem, the residual values must encompass all phases of the automotive sales cycle, including dealer engagement, manufacturer support, cooperation on pricing, and off lease supply management.

In this example, the methodology described above is adapted to estimate residual values of cars and light trucks in the United States and Canada. Estimates are updated every two months to reflect new observed data, market conditions, and macroeconomic estimates. In this example, the latest Model Year (MY) Toyota Camry LE with automatic transmission (AT)—which sells at popular equipped Manufacturer Suggested Retail Price (MSRP) of $23,800 in California—will be used. This particular model has some historical used market value and residual value data available to estimate the future value of the vehicle. Furthermore, exogenous macroeconomic and microeconomic data as well as endogenous factors (depreciation rate and competitive knowledge) are readily available to construct the current residual value curve for this vehicle at any term (e.g., 12-month, 24-month, 36-month, ..., 60-month and any term in between).

Step 1. Determine a baseline, unmodified value for the durable good, $V'_{i,0}$, e.g., through direct observation of the current market values. The 2010MY Camry LE AT baseline value for $t_0$ (set to June 2012, as an example) is $V'_{i,0}=\$13,640$ and is based on observed current market value (CMV) derived from auction data. Roughly 990 auction records were available in June 2012 for the 2010MY Camry LE AT to create the CMV of $13,640 by applying statistical filters and other measures to cleanse the data. For the purpose of illustration and not of limitation, auction records may include such information as: Sale Date; National Automobile Dealers Association (NADA) Vehicle Identification Code; Make; Sub-make; Model Year; Series; Body Style; Diesel 4WD Identifier; NADA Region code; Sale Price; Mileage; Sale Type; Vehicle Identification Number (VIN); Vehicle Identifier (VID); etc.

Step 2. At time $t_n=0$, determine a reference period, $t_{n*}$, at which adjustments will be made to align values with other durable goods in the competitive set based on the following industry-level frequencies that constrain the choice of $t_{n*}$:

auction data is updated weekly yet also aggregated to monthly numbers, while microeconomic and macroeconomic factors are updated monthly;

forecasted terms go up to 72-month, $t_{max}$ is greater than 72-month;

most common terms are 12, 24, 36, 48, and 60-month terms, mostly 36-month is used.

Because a 36-month alignment is commonly used in the automotive industry, a value of $t_{n*}=36$ months is used in this example for the reference period relative to the baseline.

Step 3. At time $t_n=0$, determine the constant width of time intervals $\Delta_{(p.q)}$ at which forecasts will be generated. In this case, the selection of $\Delta_{(p.q)}$ is determined by considering the following constraints;

It must be chosen such that $(t_{n*}-t_0)/\Delta_{(p.q)}$ is a positive integer where $t_{n*}-t_0=36$ months.

It must be greater than or equal to $\varphi^*=\min_r(\varphi_r)=$weekly since that is the frequency at which the macroeconomic data is updated.

Given those constraints and a choice of $t_{n*}=36$, the $\Delta_{(p.q)}=2$ months is used.

36-month term/2 month=18>0.

Interval is greater than $\varphi^*$ (weekly data).

Step 4. Determine a locality adjustment, $L_p$. If the base value of the goods in industry p to which durable good i is assigned varies by geographic region, then compute $$L_{p,n} = \frac{L'_{p,n}(z)}{L'_{p,n}(Z)}$$

where $L'_{p,n}(z)$ is the average cost of durable goods in industry p in locality z at time $t_n$, and $L'_{p,n}(Z)$ is the local cost of durable goods in industry p across all localities ($z \in Z$) at time $t_n$. In this example, the residual value of the 2010MY Toyota Camry LE AT is being established for California, located in the z="US West" region of the U.S. and where $$L_{west} = \frac{1.1}{1},$$

local adjustment for U.S. Western region is 110% of the average for all regions in the U.S.

Step 5. Collect or estimate incremental values of modifications, $M_{i,n}$, to the base configuration of the durable good. In this example, the vehicle has navigation added as popularly equipped which retains a measurable and tangible value of $450 at 36-month. Thus, $M_{Camry,36\text{-}month}$=$450 for all regions; and $M_{camry,36\text{-}month}$=($450×1.1) for U.S. Western region.

Step 6. Determine the locality-adjusted value of the modified good i at time $t_n$ by adjusting the base configuration's value to account for modifications and locality adjustments.

$$BV_{i,n}=(V'_{i,0}+M_{i,n})\times(\tau_{i,n}\times L_{p,n})=(\$13,640+\$450)\times 1.1=\$15,499$$

Step 7. Construct competitive sets, $C_{iW,n}$, of similar and substitute durable goods in the same industry, p. This involves determining factors to compare to for each competitor and establish a matrix such as pricing (MSRP), engine and performance (horse power, mile per gallon, torque, displacement, etc.), exterior (curb weight, wheelbase, length, width, height, wheels size, etc.), interior (dimensions, features, air conditioning, entertainment system, seats, etc.) and safety.

Based on the factors above and the matrix analysis, for example, the 2010 Honda Accord LX AT has the most similarities to the 2010 Camry LE AT, followed by 2010 Nissan Altima 2.5.

Step 8. Collect macroeconomic data, $F_{,n|n-h}$, and either forecast future levels or incorporate existing forecasts from other sources to determine $\hat{F}_{,n|n-h}$.

In this case, housing prices, real wage growth, and gas prices are collected at $t_0$ and forecasted for $t_n$. For example, if housing price index is equal to 190 index points, real wage is 59 points, and average gas prices are $3.56 per gallon in $t_0$, the forecasts are 202 points for housing, 63 points for real wage, and $3.90 for gas price in $t_{36\text{-}month}$. The various factors have coefficients which determined based on correlation to auction data and thus the impact on the forecasted values can be applied by using the coefficients (see equations described above). Hence, for example, based on the change in housing price index from currently 190 to 202 in 36-month, the impact on 36-month residual values is an incremental $200, from gas prices $170, and from wages $630. In this case, the total adjustment for macroeconomic variables is $1,000.

Step 9. Collect microeconomic data, $G_{p,n|n-h}$, for the industry in which the good being evaluated is classified and forecast future levels or incorporate existing forecasts from other sources to determine $\hat{G}_{p,n|n-h}$.

Microeconomic data, such as brand value, incentive spending, and rental fleet penetration, can be generated for $t_0$ and forecasted for $t_{36\text{-}month}$. For example, current incentive spending for the Camry is $2,900, yet the forecast is expected to be at $2,750. Thus, applying the equations described above and based on the change in incentive spending from today to 36-month, the impact is an incremental $140, from rental fleet penetration -$130, brand value $50, used supply $75, lifecycle -$85 and market volatility $1,300. In this case, the total adjustment for microeconomic variables is $1,250.

Step 10. Determine the natural depreciation values, $D_{i,n|0}$, for the durable good over time. Based on historical data, annual or 3-year depreciation can be constructed. In this example, the Camry LE AT is expected to depreciate 14% annually.

Step 11. With all the pieces assembled, forecasting the residual value for time $t_{n*}$=36 month for the 2010 Toyota Camry LE AT (with navigation, in California) can be done by substituting the values constructed in earlier steps into the equation:

$$\hat{V}'_{i,n} = BV_{i,n} \times D_{i,n|0} + (\hat{F}_{,n|n-h} + \hat{G}_{p,n|n-h})$$
$$= ((\$13,640 + \$450) \times 1.1) \times (1 - 0.14)^3 + (\$1,000 - \$1,250)$$
$$= \$9,850 - \$250$$
$$= \$9600$$

Step 12. Perform quality assurance (QA). In this example, this involves computing the adjustment value, $C_{iU,n|n*}$, that will minimizes the weighted average error relative to the position implied by the reference points. The adjustment value in the case of the Camry LE AT is small ($\Delta$<1), since it is an established good and plenty of history is available. The average residual value of entire competitive set is $9,200 and the following factors are taken into account:
  i. Baseline of the closest competitor is $9,500
  ii. 2009MY Toyota Camry LE is $10,000
Applying the equation described above, the adjustment value $C_{iU,n|n*}$ is then equal to 0.25×((0.33×9,200+0.33×$9,500+0.33×$10,000)−$9,600)=−$32

Step 13. Adjust $\hat{V}'_{i,n}$ by $C_{iU,n|n*}$ to determine the final forecasted value:

In this example, the final forecast for the 2010MY Toyota Camry LE AT for the Western region for time $t_{n*}$=36 month is $9,600−$32=$9,568.

These, and other, aspects of the disclosure and various features and advantageous details thereof are explained more fully with reference to the exemplary, and therefore non-limiting, embodiments illustrated and detailed in this disclosure. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments discussed herein can be implemented in a computer communicatively connected to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over a network connection.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software embodied on hardware, firmware or any combination thereof.

Embodiments described herein can be implemented in the form of control logic in hardware or a combination of software and hardware. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "computer" or "processor" may include any hardware system, mechanism or component that processes data, signals or other information. A computer or processor can include a system with a general-purpose central processing unit, multiple processing units, dedicated circuitry for achieving functionality, or other systems. Processing need not be limited to a geographic location, or have temporal limitations. For example, a computer or processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion.

For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A method for production of automotive residual values, the method comprising:
   determining a baseline value for a vehicle with a base configuration, the determining performed by a computer at a base time based on a market value derived from auction data;
   determining, by the computer at the base time, a reference time period for value alignment with vehicles in a competitive set, the value alignment constrained by automotive industry-level frequencies, the automotive industry-level frequencies including a frequency for which macroeconomic data is updated;
   determining, by the computer at the base time given a set of constraints, a constant width of time intervals, the set of constraints include a length of time constraint relating to the reference time period, and a frequency constraint relating to the frequency for which the macroeconomic data is updated;
   determining, by the computer, a locality adjustment based on an average cost of vehicles in the automotive industry in a locality at a reference time and a local cost of vehicles in the automotive industry across a plurality of localities at the reference time;
   obtaining, by the computer, any incremental values of modification to the base configuration of the vehicle;
   producing, by the computer, a locality-adjusted value of the vehicle at the reference time, the producing comprising adjusting the baseline value associated with the base configuration to account for any modifications to the base configuration of the vehicle and to account for the locality adjustment;
   determining, by the computer, an adjustment for macroeconomic variables at the reference time based at least in part on the macroeconomic data collected at the base time;
   determining, by the computer, an adjustment for microeconomic variables at the reference time based at least in part on the microeconomic data collected at the base time;
   generating, by the computer, a residual value of the vehicle at the reference time with the adjustment for the macroeconomic variables at the reference time and the adjustment for the microeconomic variables at the reference time; and
   communicating over a network the residual value of the vehicle at the reference time to a graphical user interface on a client device.

2. The method according to claim 1, further comprising:
   constructing competitive sets of similar and substitute vehicles in the automotive industry, the constructing comprising determining factors to compare to for each competitor, establishing a matrix of vehicle features, and performing a matrix analysis on the matrix.

3. The method according to claim 2, further comprising:
   determining a quality assurance adjustment based at least in part on an average residual value of a competitive set of the competitive sets, the residual value of the vehicle at the reference time, and a baseline of a closest competitor from the competitive sets; and
   applying the quality assurance adjustment to the residual value of the vehicle at the reference time.

4. The method according to claim 1, further comprising:
   determining natural depreciation values for the vehicle over time based on historical data, wherein the residual value of the vehicle at the reference time accounts for the natural depreciation values.

5. The method according to claim 1, wherein the auction data comprises auction records from data sources external to the computer.

6. The method according to claim 1, wherein the computer collects in a data store data of a plurality of data types from various data sources, the plurality of data types including the modifications, the locality, the macroeconomic data, and the microeconomic data.

7. The method according to claim 1, wherein the microeconomic data is specific to the automotive industry and wherein the macroeconomic data is not specific to the vehicle or to the automotive industry.

8. A system for production of automotive residual values, the system comprising:
   at least one processor;
   at least one non-transitory computer-readable medium; and
   stored instructions translatable by the at least one processor to perform:
      determining a baseline value for a vehicle with a base configuration, the determining performed at a base time based on a market value derived from auction data;
      determining, at the base time, a reference time period for value alignment with vehicles in a competitive set, the value alignment constrained by automotive industry-level frequencies, the automotive industry-level frequencies including a frequency for which macroeconomic data is updated;
      determining, at the base time given a set of constraints, a constant width of time intervals, the set of constraints include a length of time constraint relating to the reference time period, and a frequency constraint relating to the frequency for which the macroeconomic data is updated;

determining a locality adjustment based on an average cost of vehicles in the automotive industry in a locality at a reference time and a local cost of vehicles in the automotive industry across a plurality of localities at the reference time;

obtaining any incremental values of modification to the base configuration of the vehicle;

producing a locality-adjusted value of the vehicle at the reference time, the producing comprising adjusting the baseline value associated with the base configuration to account for any modifications to the base configuration of the vehicle and to account for the locality adjustment;

determining an adjustment for macroeconomic variables at the reference time based at least in part on the macroeconomic data collected at the base time;

determining an adjustment for microeconomic variables at the reference time based at least in part on the microeconomic data collected at the base time;

generating a residual value of the vehicle at the reference time with the adjustment for the macroeconomic variables at the reference time and the adjustment for the microeconomic variables at the reference time; and communicating over a network the residual value of the vehicle at the reference time to a graphical user interface on a client device.

9. The system of claim 8, wherein the instructions are further translatable by the at least one processor to perform:

constructing competitive sets of similar and substitute vehicles in the automotive industry, the constructing comprising determining factors to compare to for each competitor, establishing a matrix of vehicle features, and performing a matrix analysis on the matrix.

10. The system of claim 9, wherein the instructions are further translatable by the at least one processor to perform:

determining a quality assurance adjustment based at least in part on an average residual value of a competitive set of the competitive sets, the residual value of the vehicle at the reference time, and a baseline of a closest competitor from the competitive sets; and applying the quality assurance adjustment to the residual value of the vehicle at the reference time.

11. The system of claim 8, wherein the instructions are further translatable by the at least one processor to perform:

determining natural depreciation values for the vehicle over time based on historical data, wherein the residual value of the vehicle at the reference time accounts for the natural depreciation values.

12. The system of claim 8, wherein the auction data comprises auction records from data sources external to the computer.

13. The system of claim 8, further comprising:

a data store storing data of a plurality of data types from various data sources, the plurality of data types including the modifications, the locality, the macroeconomic data, and the microeconomic data.

14. The system of claim 8, wherein the microeconomic data is specific to the automotive industry and wherein the macroeconomic data is not specific to the vehicle or to the automotive industry.

15. A computer program product for production of automotive residual values, the computer program product comprising at least one non-transitory computer-readable medium storing instructions translatable by at least one processor to perform:

determining a baseline value for a vehicle with a base configuration, the determining performed at a base time based on a market value derived from auction data;

determining, at the base time, a reference time period for value alignment with vehicles in a competitive set, the value alignment constrained by automotive industry-level frequencies, the automotive industry-level frequencies including a frequency for which macroeconomic data is updated;

determining, at the base time given a set of constraints, a constant width of time intervals, the set of constraints include a length of time constraint relating to the reference time period, and a frequency constraint relating to the frequency for which the macroeconomic data is updated;

determining a locality adjustment based on an average cost of vehicles in the automotive industry in a locality at a reference time and a local cost of vehicles in the automotive industry across a plurality of localities at the reference time;

obtaining any incremental values of modification to the base configuration of the vehicle;

producing a locality-adjusted value of the vehicle at the reference time, the producing comprising adjusting the baseline value associated with the base configuration to account for any modifications to the base configuration of the vehicle and to account for the locality adjustment;

determining an adjustment for macroeconomic variables at the reference time based at least in part on the macroeconomic data collected at the base time;

determining an adjustment for microeconomic variables at the reference time based at least in part on the microeconomic data collected at the base time;

generating a residual value of the vehicle at the reference time with the adjustment for the macroeconomic variables at the reference time and the adjustment for the microeconomic variables at the reference time; and communicating over a network the residual value of the vehicle at the reference time to a graphical user interface on a client device.

16. The computer program product of claim 15, wherein the instructions are further translatable by the at least one processor to perform:

constructing competitive sets of similar and substitute vehicles in the automotive industry, the constructing comprising determining factors to compare to for each competitor, establishing a matrix of vehicle features, and performing a matrix analysis on the matrix.

17. The computer program product of claim 16, wherein the instructions are further translatable by the at least one processor to perform:

determining a quality assurance adjustment based at least in part on an average residual value of a competitive set of the competitive sets, the residual value of the vehicle at the reference time, and a baseline of a closest competitor from the competitive sets; and applying the quality assurance adjustment to the residual value of the vehicle at the reference time.

18. The computer program product of claim 15, wherein the instructions are further translatable by the at least one processor to perform:

determining natural depreciation values for the vehicle over time based on historical data, wherein the residual value of the vehicle at the reference time accounts for the natural depreciation values.

19. The computer program product of claim 15, wherein the auction data comprises auction records from data sources external to the computer.

20. The computer program product of claim 15, wherein the microeconomic data is specific to the automotive industry and wherein the macroeconomic data is not specific to the vehicle or to the automotive industry.

\* \* \* \* \*